(12) United States Patent
Bai et al.

(10) Patent No.: US 11,808,880 B2
(45) Date of Patent: Nov. 7, 2023

(54) HIGH RESOLUTION MIMO RADAR SYSTEM

(71) Applicant: AyDeeKay LLC, Aliso Viejo, CA (US)

(72) Inventors: Jian Bai, Gilbert, AZ (US); Nader Rohani, Scottsdale, AZ (US)

(73) Assignee: AyDeeKay LLC, Aliso Viejo, CA (US)

(*) Notice: Subject to any disclaimer, the term of this patent is extended or adjusted under 35 U.S.C. 154(b) by 0 days.

(21) Appl. No.: 18/083,497

(22) Filed: Dec. 17, 2022

(65) Prior Publication Data
US 2023/0273297 A1 Aug. 31, 2023

Related U.S. Application Data

(63) Continuation of application No. 16/799,404, filed on Feb. 24, 2020, now Pat. No. 11,555,882.

(60) Provisional application No. 62/817,030, filed on Mar. 12, 2019.

(51) Int. Cl.
G01S 7/35 (2006.01)
G01S 13/931 (2020.01)
G01S 13/32 (2006.01)

(52) U.S. Cl.
CPC .............. G01S 7/35 (2013.01); G01S 13/325 (2013.01); G01S 13/931 (2013.01)

(58) Field of Classification Search
CPC .......... G01S 7/35; G01S 7/524; G01S 13/325; G01S 13/931
See application file for complete search history.

(56) References Cited

U.S. PATENT DOCUMENTS

| 5,815,529 A | * | 9/1998 | Wang | H04H 20/46 375/280 |
| 6,236,352 B1 | * | 5/2001 | Walmsley | G01S 13/348 342/134 |
| 6,242,990 B1 | * | 6/2001 | Sokolov | H01P 1/185 332/146 |
| 9,887,862 B2 | * | 2/2018 | Zhou | H04L 25/08 |
| 10,491,303 B2 | * | 11/2019 | Ashrafi | H01Q 21/0025 |
| 2003/0179131 A1 | * | 9/2003 | Brosche | G01S 7/36 342/194 |
| 2004/0150548 A1 | * | 8/2004 | Walmsley | G01S 13/588 342/134 |

(Continued)

OTHER PUBLICATIONS

Hongyu Li, Ming Li, Qian Liu, "Hybrid Beamforming with Dynamic Subarrays and Low-Resolution PSs for mmWave MU-MISO Systems," IEEE Transactions on Communications, vol. 68, No. 1, Jan. 2020, pp. 602-614.

Primary Examiner — Peter M Bythrow
(74) Attorney, Agent, or Firm — Steven Stupp

(57) ABSTRACT

An automotive radar system includes multiple radar antennas and a radar front end chip. The front end chip includes a plurality of phase rotators coupled to a local oscillator, wherein each phase rotator of the plurality of phase rotators is coupled to multiple digital phase modulators; a plurality of switches that couple selectable ones of the multiple digital phase modulators to respective amplifiers, each amplifier coupled to a respective antenna output; and a controller which provides digital control signals to the plurality of phase rotators, the multiple digital phase modulators, and the plurality of switches to synthesize transmit signals for each of the multiple radar antennas.

20 Claims, 10 Drawing Sheets

(56) References Cited

U.S. PATENT DOCUMENTS

| | | | |
|---|---|---|---|
| 2005/0035899 A1* | 2/2005 | Gottwald | G01S 7/285 |
| | | | 342/194 |
| 2010/0008679 A1* | 1/2010 | Cole | H04B 10/58 |
| | | | 398/185 |
| 2013/0135140 A1* | 5/2013 | Kishigami | G01S 7/282 |
| | | | 342/202 |
| 2013/0321198 A1* | 12/2013 | Park | G01S 13/02 |
| | | | 342/175 |
| 2015/0222344 A1* | 8/2015 | Guermandi | H04B 1/0475 |
| | | | 375/296 |
| 2015/0369912 A1* | 12/2015 | Kishigami | G01S 13/34 |
| | | | 342/104 |
| 2016/0103206 A1* | 4/2016 | Pavao-Moreira | G01S 13/345 |
| | | | 342/104 |
| 2016/0131752 A1* | 5/2016 | Jansen | G01S 13/42 |
| | | | 342/27 |
| 2017/0038464 A1* | 2/2017 | Campbell | G01S 17/32 |
| 2017/0212213 A1* | 7/2017 | Kishigami | G01S 13/284 |
| 2017/0299711 A1* | 10/2017 | Kishigami | G01S 13/5242 |
| 2017/0331653 A1* | 11/2017 | Higashinaka | H04L 27/32 |
| 2018/0074181 A1* | 3/2018 | Kishigami | G01S 13/282 |
| 2018/0088224 A1* | 3/2018 | Kishigami | H01Q 21/06 |
| 2019/0157757 A1* | 5/2019 | Murakowski | H01Q 21/0025 |
| 2019/0187245 A1* | 6/2019 | Guarin Aristizabal | |
| | | | G01S 13/931 |
| 2019/0187273 A1* | 6/2019 | Tong | H01P 5/227 |
| 2019/0235050 A1* | 8/2019 | Maligeorgos | G01S 7/032 |
| 2020/0049812 A1* | 2/2020 | Jansen | G01S 13/4454 |
| 2020/0191939 A1* | 6/2020 | Wu | G01S 7/354 |
| 2021/0278526 A1* | 9/2021 | Pedross-Engel | G01S 13/89 |

* cited by examiner $$C_{bpsk} = \begin{bmatrix} +1 & +1 & +1 & +1 & -1 & -1 \\ +1 & +1 & -1 & -1 & +1 & +1 \\ +1 & -1 & +1 & -1 & +1 & -1 \\ +1 & -1 & -1 & +1 & -1 & +1 \end{bmatrix}$$

FIG. 9A

| TX11 | TX21 | TX31 | TX12 | TX22 | TX32 |
|---|---|---|---|---|---|
| 0 (BPSK11=+1,PR1=0) | 0 (BPSK21=+1,PR2=0) | 0 (BPSK31=+1,PR3=0) | 0 (BPSK12=+1,PR1=0) | 0 (BPSK22=+1,PR2=0) | 0 (BPSK32=+1,PR3=0) |
| 0 (BPSK11=+1,PR1=0) | 60 (BPSK21=+1,PR2=60) | 120 (BPSK31=+1,PR3=120) | 180 (BPSK12=-1,PR1=0) | 240 (BPSK22=-1,PR2=60) | 300 (BPSK32=-1,PR3=120) |
| 0 (BPSK11=+1,PR1=0) | 120 (BPSK21=+1,PR2=120) | 240 (BPSK31=+1,PR3=240) | 0 (BPSK12=+1,PR1=0) | 120 (BPSK22=-1,PR2=120) | 240 (BPSK32=+1,PR3=240) |
| 0 (BPSK11=+1,PR1=0) | 180 (BPSK21=-1,PR2=0) | 0 (BPSK31=+1,PR3=0) | 180 (BPSK12=-1,PR1=0) | 0 (BPSK22=+1,PR2=0) | 180 (BPSK32=-1,PR3=0) |
| 0 (BPSK11=+1,PR1=0) | 240 (BPSK21=-1,PR2=60) | 120 (BPSK31=+1,PR3=120) | 0 (BPSK12=+1,PR1=0) | 240 (BPSK22=-1,PR2=60) | 120 (BPSK32=+1,PR3=120) |
| 0 (BPSK11=+1,PR1=0) | 300 (BPSK21=+1,PR2=300) | 240 (BPSK31=+1,PR3=240) | 180 (BPSK12=-1,PR1=0) | 120 (BPSK22=-1,PR2=300) | 60 (BPSK32=-1,PR3=240) |

FIG. 9B

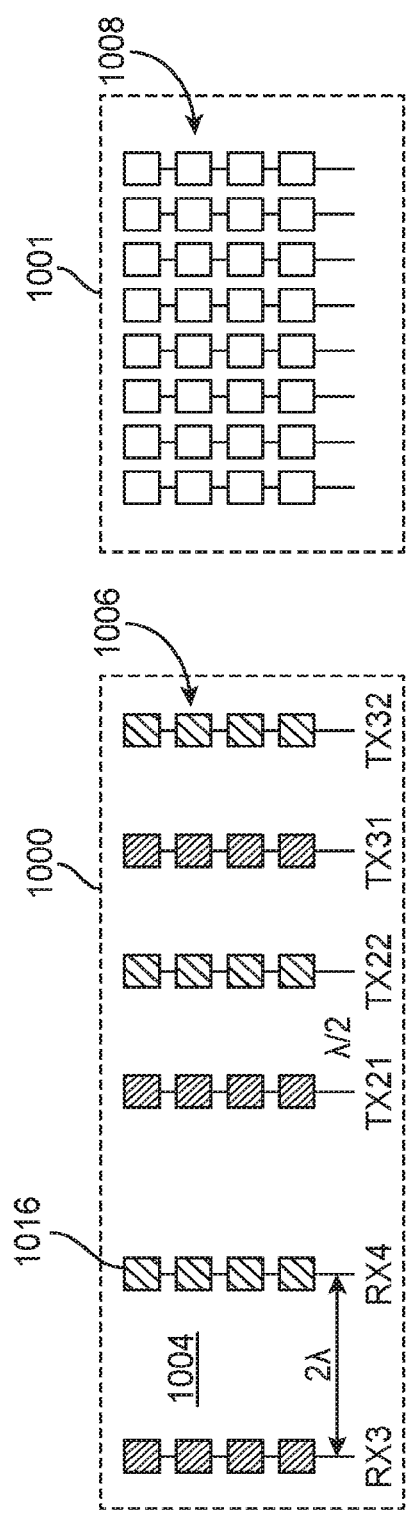
FIG. 10A
FIG. 10B
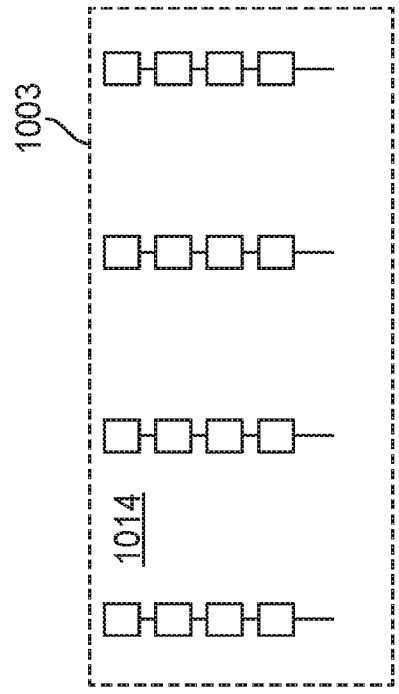
FIG. 10D
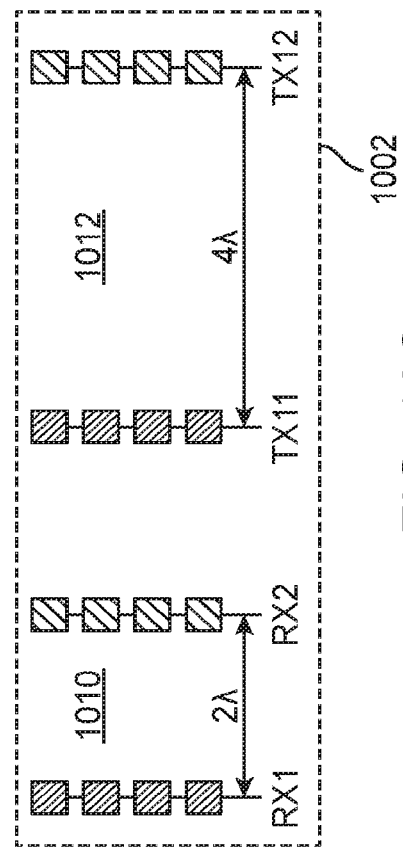
FIG. 10C

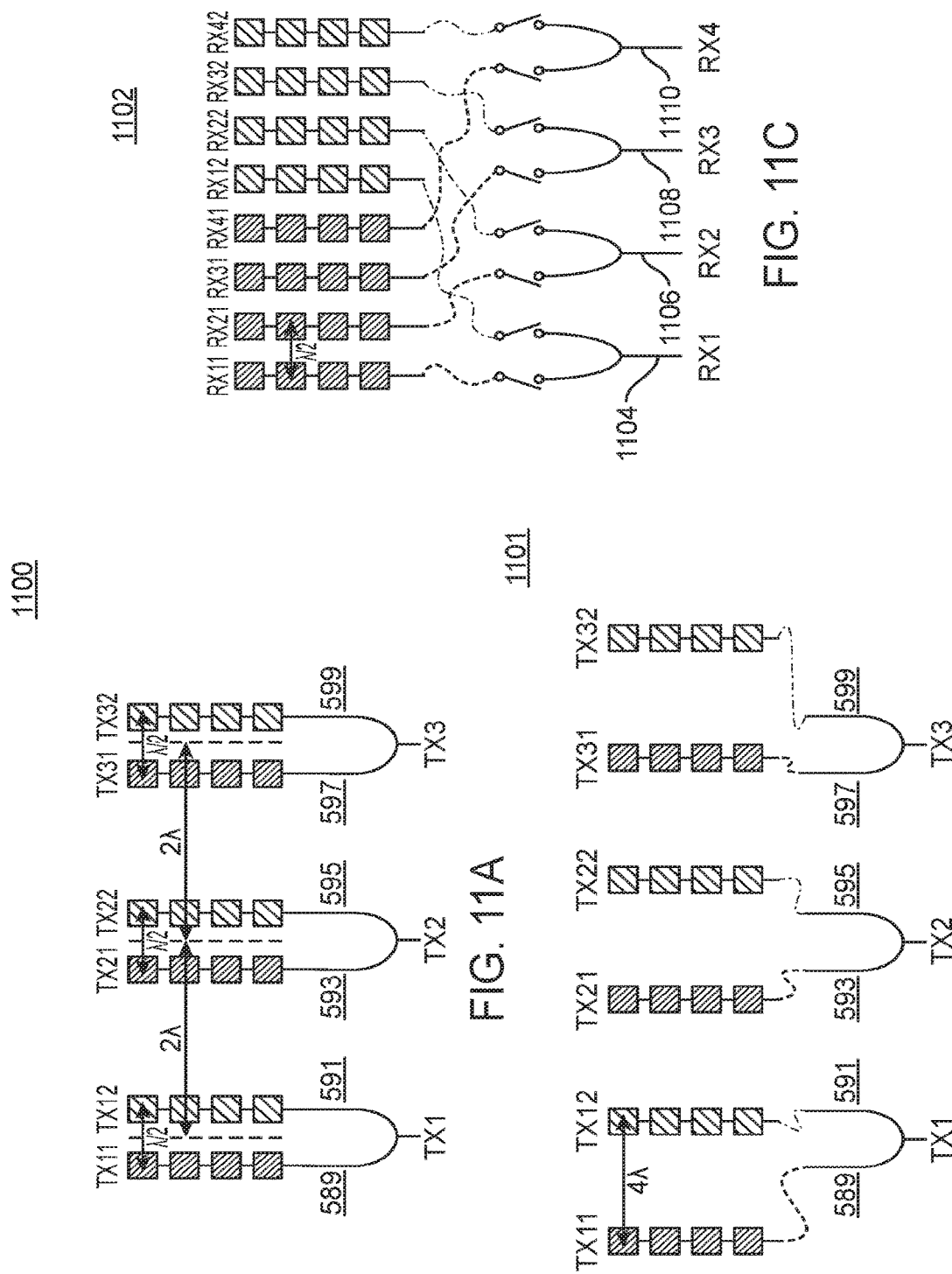

HIGH RESOLUTION MIMO RADAR SYSTEM

CROSS-REFERENCE TO RELATED APPLICATION

This application is a continuation of U.S. patent application Ser. No. 16/799,404, "HIGH RESOLUTION MIMO RADAR TRANSMITTER ARCHITECTURE," filed on Feb. 24, 2020 (now U.S. Pat. No. 11,555,882), which claims the benefit of U.S. Provisional Patent Application No. 62/817,030, entitled "HIGH RESOLUTION MIMO RADAR TRANSMITTER ARCHITECTURE," filed on Mar. 12, 2019, the entire contents of both of which are incorporated herein by reference.

FIELD

This application pertains generally to frequency-modulated continuous-wave radar systems. This application pertains particularly to frequency-modulated continuous-wave radar systems having a multiple input multiple output (MIMO) architecture.

BACKGROUND

In the quest for ever-safer and more convenient transportation options, many car manufacturers are developing self-driving cars which require an impressive number and variety of sensors, often including arrays of acoustic and/or electromagnetic sensors to monitor the distance between the car and any nearby persons, pets, vehicles, or obstacles. Many such arrays, however, are unable to provide a desired level of angular resolution with respect to objects at greater distances.

Thus, there is room for improvement in the art.

SUMMARY

In accordance with an example of this disclosure, a radar-chirped local oscillator (LO) signal is split into N ways and one phase rotator (PR) is included in each way. Then, every split way is further split into M ways, (sub-arrays), and each one of M ways is comprised of one bi-phase shifter-key (BPSK) modulator, switch, power amplifier (PA) driver and PA unit. Using an output network, each PA unit can drive one single-end antenna, or two combined PA cells can drive one differential-end antenna. A controller, e.g., a direct digital synthesizer, generates modulation signal for PA(s), BPSK(s) and switch(es).

In accordance with an example of this disclosure, a transmit architecture increases the channel number by M times compared with existing radar sensors. The transmit architecture can improve angular resolution by M times. The transmit architecture offers two MIMO configure states, namely, MIMO and MIMO+. In the MIMO state, N equivalent MIMO transmit channels are available, wherein the radar signal in M ways of every sub-array share the same modulation and are coherently combined via antennas. In the MIMO+ state, M×N MIMO channels are available, wherein radar signal in all channels across and within sub-arrays is modulated differently.

BRIEF DESCRIPTION OF THE DRAWINGS

FIG. 9A illustrates a 4×4 matrix corresponding to Hadamard code that can be used to modulate transmit channels, in accordance with an example of this disclosure.

FIG. 9B is a table illustrating a relationship of transmission antennas, in accordance with an example of this disclosure.

FIG. 10A illustrates a physical antenna arrangement of a radar system, in accordance with an example of this disclosure.

FIG. 10B illustrates a virtual antenna counterpart to the physical arrangement of FIG. 10A.

FIG. 10C illustrates a physical antenna arrangement of a radar system for longer-range detection, in accordance with an example of this disclosure.

FIG. 10D illustrates the virtual antenna counterpart to the physical arrangement of FIG. 10C.

FIG. 11A illustrates a radar system with three transmit, in accordance with an example of this disclosure.

FIG. 11B illustrates a radar system with six transmit channels, in accordance with an example of this disclosure.

FIG. 11C illustrates a radar system with eight receiver antennas, in accordance with an example of this disclosure.

Figure 1:
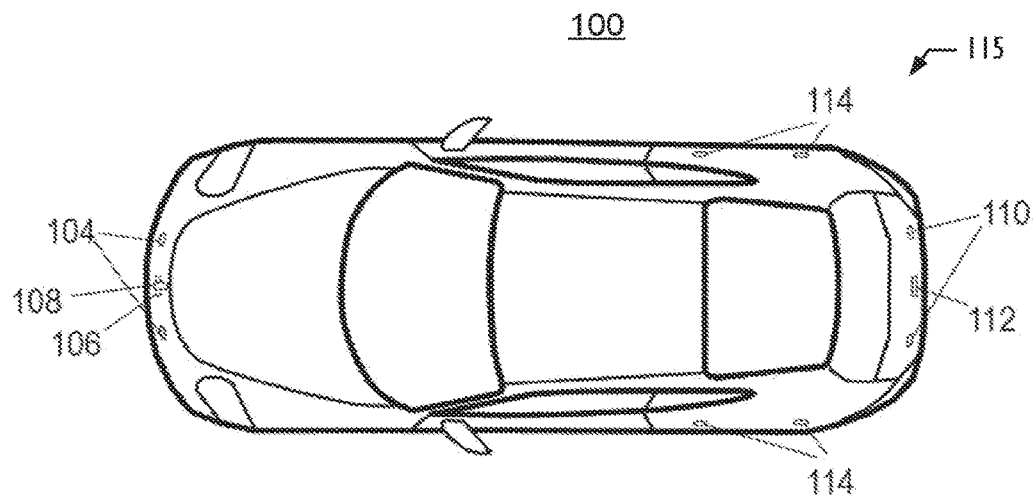
FIG. 1 illustrates a vehicle equipped with radar sensors, in accordance with an example of this disclosure.

The accompanying drawings and following detailed description do not limit the disclosure, but on the contrary, they provide the foundation for understanding all modifications, equivalents, and alternatives falling within the scope of the appended claims. Specific configurations, parameter values, and examples are explanatory, not restrictive.

DETAILED DESCRIPTION

In accordance with one or more examples of this disclosure, a MIMO radar system is described which uses virtual channels. One technical advantage of the architectures described is that they provide a higher angular resolution than would be the case in their absence, while obviating the need to increase the number of physical channels to achieve such higher resolution. In examples of this disclosure, a physical channel includes a receiver and a transmitter in a radio frequency (RF) front end circuit and/or a RF baseband circuit. A channel is a track or path between two nodes with enough bandwidth to enable communication of information between them. By changing the way two nodes communicate at different moments, and the nature of the signal they carry, the number of effective (virtual) paths or channels between the nodes can be increased.

In at least one example of this disclosure, the angular resolution of a MIMO radar system is a function of the MIMO radar system's number of virtual channels. In examples of this disclosure, the number of virtual channels is the product of the quantity of receive antennas and the quantity of transmit antennas in the MIMO radar system. In an example, 192 virtual channels are—when configured as described herein—available in a MIMO radar system with 12 transmit antennas and 16 receive antennas. In at least one example, highly integrated radar sensors with deep submicron CMOS technology are paired with MIMO technology.

A technical advantage of the disclosed technology is that the technology allows for increased transmit channels without undesirable increases in power consumption, unwanted thermal conditions, and/or notable enlargement of host die size. In examples of this disclosure, a MIMO radar system can selectably modulate different MIMO waveforms depending on the situation. At least one benefit of the technology is that the radar systems are more robust and less susceptible to varying interfering signals in practical environments.

Technical benefits of the described technology include increased radar transmit channels with minimal increases in power consumption and/or heat generation. In at least one example, a MIMO radar system provides intra-subarray spatial power combining (see e.g., FIG. 8) and inter-subarray beamforming. In examples of this disclosure, a MIMO radar system can generate different types of MIMO waveforms, including time-division multiplexing (TDM), code-division multiplexing (CDM), and doppler-division multiplexing (DDM), using fewer components than would otherwise be the case. At least one example of this disclosure includes a flexible transmit output-to-antenna interface which enables multiple kinds of antenna operations to be performed.

FIG. 1 shows an illustrative vehicle 100 equipped with arrays 115 of radar antennas, including antennas 104 for short range sensing (e.g., for park assist), antennas 106 for mid-range sensing (e.g., for monitoring stop & go traffic and cut-in events), antennas 108 for long range sensing (e.g., for adaptive cruise control and collision warning), each of which may be placed behind the front bumper cover. Antennas 110 for short range sensing (e.g., for back-up assist) and antennas 112 for mid-range sensing (e.g., for rear collision warning) may be placed behind the back-bumper cover. Antennas 114 for short range sensing (e.g., for blind spot monitoring and side obstacle detection) may be placed behind the car fenders. Each antenna and each set of antennas may be grouped in one or more arrays. Each array may be controlled by a radar array controller (205). Each set of antennas may perform multiple-input multiple-output (MIMO) radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles.

Figure 2:
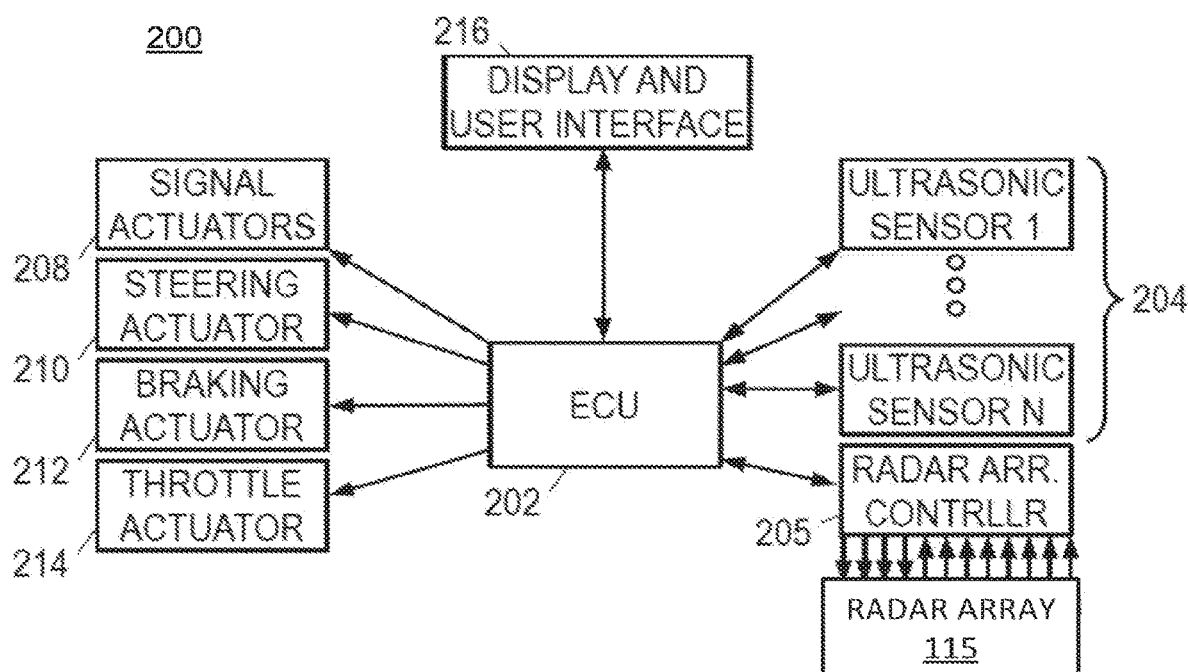
FIG. 2 is a block diagram of a driver-assistance system, in accordance with an example of this disclosure.

FIG. 2 is a block diagram of a driver-assistance system 200 for a vehicle (e.g., 100). Control network 200 includes an electronic control unit (ECU) 202 coupled to various ultrasonic sensors 204 and a radar array controller 205 as the center of a star topology. Other topologies including serial, parallel, and hierarchical (tree) topologies, are also suitable and contemplated for use in accordance with the principles disclosed herein. The radar array controller 205 couples to the transmit and receive antennas in the radar antenna arrays 115 to transmit electromagnetic waves, receive reflections, and determine a spatial relationship of the vehicle to its surroundings. The radar array controller 205 couples to carrier signal generators. In at least one example, the radar array controller 205 controls the timing and order of actuation of a plurality of carrier signal generators.

To provide automated parking assistance, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

Using the interface, sensors, and actuators, ECU 202 may provide automated parking, assisted parking, lane-change assistance, obstacle and blind-spot detection, autonomous driving, and other desirable features. In an automobile, the various sensor measurements are acquired by one or more ECU 202, and may be used by the ECU 202 to determine the automobile's status. The ECU 202 may further act on the status and incoming information to actuate various signaling and control transducers to adjust and maintain the automobile's operation. Among the operations that may be provided by the ECU 202 are various driver-assist features including automatic parking, lane following, automatic braking, and self-driving.

To gather the necessary measurements, the ECU 202 may employ a MIMO radar system. Radar systems operate by emitting electromagnetic waves which travel outward from the transmit antenna before being reflected towards a receive antenna. The reflector can be any moderately reflective object in the path of the emitted electromagnetic waves. By measuring the travel time of the electromagnetic waves from the transmit antenna to the reflector and back to the receive antenna, the radar system can determine the distance to the reflector and its velocity relative to the vehicle. If multiple transmit or receive antennas are used, or if multiple measurements are made at different positions, the radar system can determine the direction to the reflector and hence track the location of the reflector relative to the vehicle. With more sophisticated processing, multiple reflectors can be tracked. At least some radar systems employ array processing to "scan" a directional beam of electromagnetic waves and construct an image of the vehicle's surroundings. Both pulsed and continuous-wave implementations of radar systems can be implemented.

Figure 3:
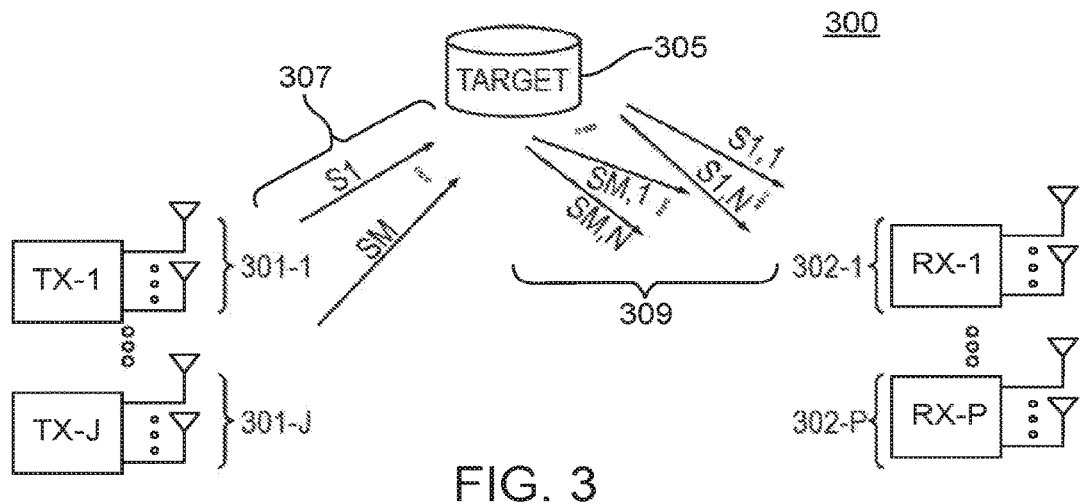
FIG. 3 illustrates a radar system, in accordance with an example of this disclosure.

FIG. 3 shows an illustrative radar system 300 having a MIMO configuration, in which J transmitters are collectively coupled to M transmit antennas 301 to send transmit signals 307. The M possible signals 307 may variously reflect from one or more targets 305 to be received as receive signals 309 via N receive antennas 302 coupled to P receivers. Each receiver may extract the amplitude and phase, or travel delay associated with each of the M transmit signals 307, thereby enabling the system to obtain N*M measurements (though only J*P of the measurements may be obtained concurrently). The processing requirements associated with each receiver extracting J measurements can be reduced via the use of time division multiplexing and/or orthogonal coding. The available antennas are systematically multiplexed to the available transmitters and receivers to collect the full set of measurements for radar imaging.

Figure 4:
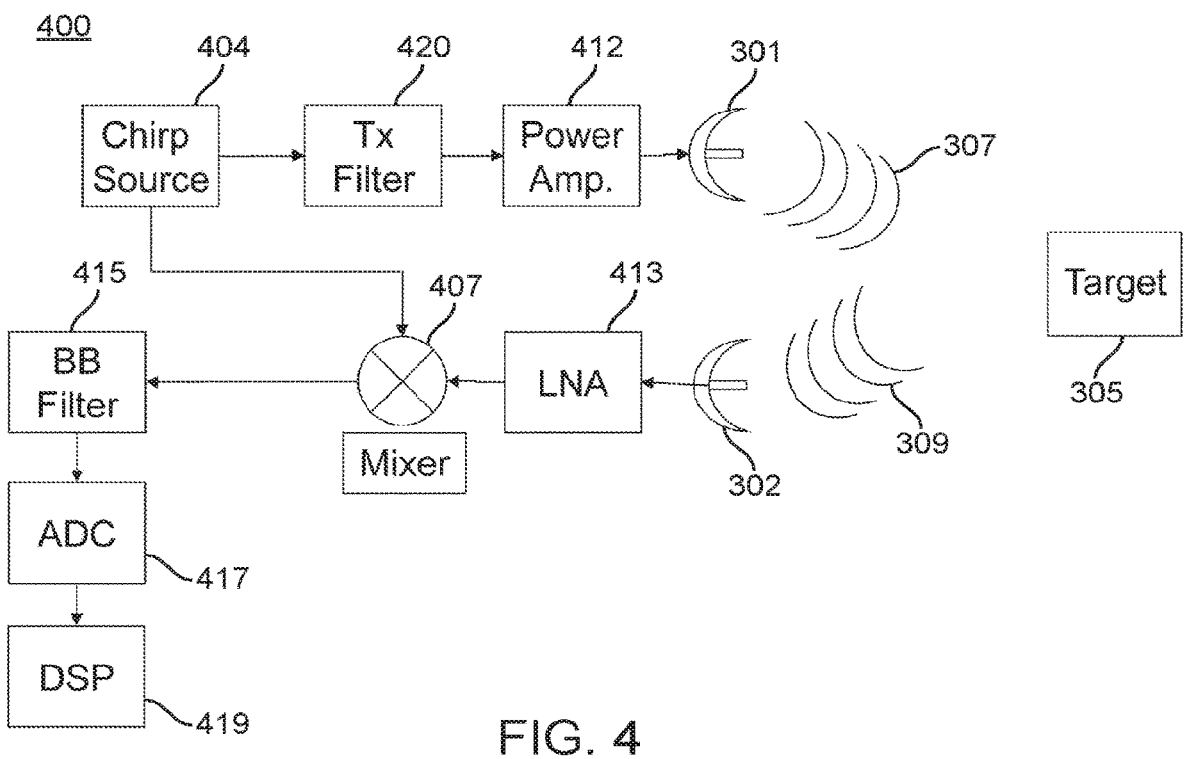
FIG. 4 illustrates a radar system, in accordance with an example of this disclosure.

FIG. 4 illustrates a radar system 400 (e.g., 300) in block diagram form, in accordance with an example of this disclosure. In at least one example, the radar system 400 is implemented as an integrated circuit in a packaged chip, such as a front end chip. Radar system 400 includes a carrier signal generator 404, a transmission filter 420, an amplifier 412, and transmit antennas 301 which can transmit signals 307 (e.g., chirps 409) based on the output of the carrier signal generator 404. Radar system 400 also includes receiver antennas 302, a low noise amplifier 413, and a mixer 407. Mixer 407 mixes signals (e.g., 411) detected by antennas 302 with the signal from the carrier signal generator 404. Low noise amplifier 413 is used to amplify signals 411 detected by antennas 302. Radar transceiver circuit 402 also includes a sensitivity time controller and equalizer 413, a broadband filter 415, an analog-to-digital converter 417 and a processor 419 (e.g., 202, 205). The processor 419 and low noise amplifier 413 can be coupled for bi-directional communication as shown. Transmitted signals 307 are reflected off targets and the reflected signals 309 are received by received antennas 302.

In examples of this disclosure, carrier signal generator 404 is coupled to the radar array controller 205. Carrier signal generator 404 includes a chirp generator to create a frequency-modulated continuous-wave (FMCW) signal. The chip rate of the carrier signal generator 404 may be controlled by the radar array controller 205. In at least one example, the carrier signal generator 404 can be deactivated by the radar array controller 205 to provide an unmodulated carrier signal. The carrier signal generator 404 may be implemented as a local oscillation (LO) signal generator as a fractional-N phase lock loop (PLL) with a $\Sigma\Delta$ controller, or as a direct-digital synthesis generator.

Carrier signal generator 404 is connected to transmit antennas 301 through transmission filter 420 and amplifier 412. Carrier signal generator 404 is connected to receiving antennas 302 through mixer 407 and low noise amplifier 413. Carrier signal generator 404 generates a signal (e.g., a chirp signal). Amplifier 412 receives the signal from carrier signal generator 404 and a transmission signal 307 corresponding to the signal from carrier signal generator 404 is transmitted using transmit antennas 301.

Figure 5:
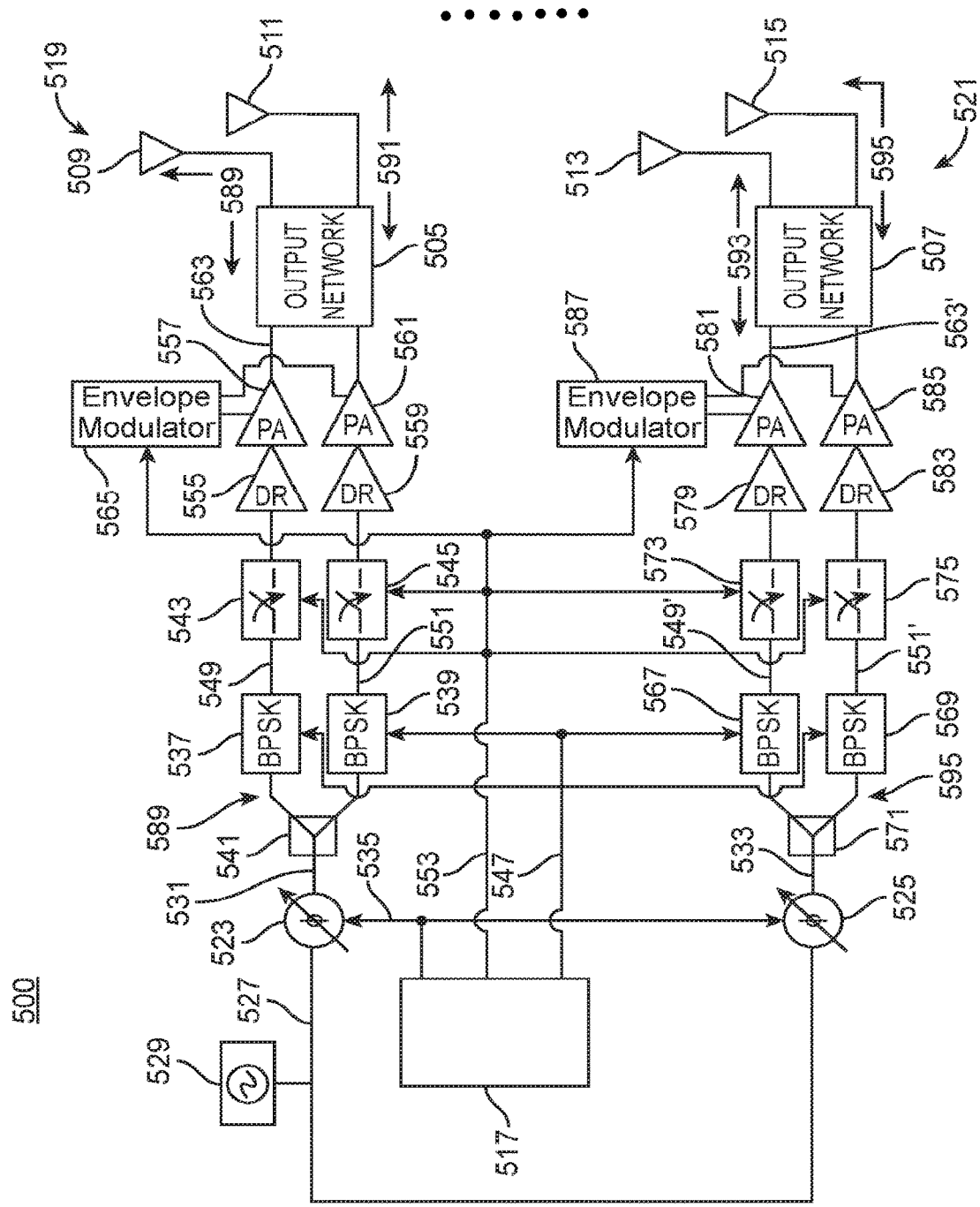
FIG. 5 illustrates a radar system, in accordance with an example of this disclosure.

FIG. 5 illustrates a radar transmit system 500 (e.g., 300, 400) in block diagram form, in accordance with an example of this disclosure. In at least one example, the radar system 500 is implemented as an integrated circuit in a packaged chip, (e.g., a front end chip). The radar system 500 includes a controller 517 and a plurality of output networks 505, 507. The controller 517 can comprise a digital signal synthesizer (DSS) or a direct digital synthesizer (DDS). The controller 517 can cause the output networks 505, 507 to perform TDM, CDM and DDM.

Each output network 505, 507 drives a plurality of antennas (e.g., 301) 509, 511, 513, 515, (the radar system 500 can include N antennas formed in the same form as the four transmit antennas 509, 511, 513, 515 shown). In some examples, one or more output networks 505, 507 comprises a reconfigurable antenna interface. In at least one example, the output networks 505, 507 enable intra-subarray special power combining, as well as increased numbers of transmit channels. Antennas 509, 511, 513, 515 form an array. Antennas 509 and 511 form a first subarray 519. Antennas 513 and 515 form a second subarray 519. A first output network 505 has a dual path connection with a first phase rotator 523, and a second output network 507 has a dual path connection with a second phase rotator 525. The first phase rotator 523 and the second phase rotator 525 receive an oscillation signal 527 from an oscillation generator 529. The first phase rotator 523 outputs a first phase modulated signal 531 and the second phase rotator 525 outputs a second phase modulated signal 533. In more than one example of this disclosure, the first phase rotator 523 and the second phase rotator 525 facilitate inter-subarray beamforming. The first phase modulated signal 531 is based on the oscillation signal 527 and a control signal received through bus 535 from the controller 517. The second phase modulated signal 533 is based on the oscillation signal 527 and a control signal received over bus 535 from the controller 517. In at least one example of this disclosure, the first phase rotator 523 is configured to rotate the phase of the oscillation signal 527 to a different extent than the second phase rotator 525 rotates the phase of the oscillation signal 527. In that case, the first phase rotated signal 531 will be out of phase with the second phase rotated signal 533.

The first phase rotator 523 is connected to a first BPSK modulator 537 and a second BPSK modulator 539 by a first power splitter 541. The first power splitter 541 transmits a first copy of the first modulated signal 531 to the first BPSK modulator 537, and a second copy to the second BPSK modulator 539. The first BPSK modulator 537 is connected to a first switching device 545, and the second BPSK modulator 539 is connected to a second switching device 545. The first BPSK modulator 539 modulates the first copy of the first phase-rotated signal 531 in accordance with a control signal received through bus 547 from the controller 517. The second BPSK modulator 539 modulates the second copy of the first phase-rotated signal 531 in accordance with a control signal received through bus 547 from the controller 517.

The first switching device 543 enables the signal 549 from the first BPSK modulator 537 to be transmitted to the first output network 505 when the first switching device 543 is closed and prevents the signal 549 from the first BPSK modulator 537 from being transmitted to the first output network 505 when open.

The second switching device 545 enables the signal 551 from the second BPSK modulator 539 to be transmitted to the first output network 505 when the second switching device 545 is closed and prevents the signal 551 from the second BPSK modulator 539 from being transmitted to the first output network 505 when open.

The open and closed positions of the first switching device 543 and the second switching device 545 are driven by a control signal received through bus 553 from the controller 517.

When the first switching device 543 is closed, the signal 549 from the first BPSK modulator 537 passes through a first driver 555 and power amplifier (PA) 557 to the first output network 505. When the second switching device 545 is closed, the signal 551 from the second BPSK modulator 539 passes through a second driver 559 and second PA 561 to the first output network 505. In examples of this disclosure, spatial power combining and modulation of PA (e.g., 557, 561) controls cause transmitters to consume power in an efficient manner.

The envelope of the signal 563 from the first PA 557 is modulated by a first envelope modulation circuit 565 in accordance with a control signal received through bus 553 from the controller 517. The envelope of the signal from the second PA 561 is modulated by the first envelope modulation circuit 565 in accordance with a control signal from the controller 517 received over bus 553.

The operational relationship between the components interposed between the second phase rotator 525 and the second output network 507 is the same as the operational relationship between like components interposed between the first phase rotator 523 and the first output network 505. The second phase rotator 525 is connected to a third BPSK modulator 567 and a fourth BPSK modulator 569 by a second power splitter 571. The second power splitter 571 transmits a first copy of the second rotated signal 533 to the third BPSK modulator 567, and a second copy to the fourth BPSK modulator 569. The third BPSK modulator 567 is connected to a third switching device 573, and the fourth BPSK modulator 569 is connected to a fourth switching device 575. The third BPSK modulator 567 modulates the first copy of the second phase-rotated signal 533 in accordance with a control signal received through bus 547 from the controller 517. The fourth BPSK modulator 569 modulates the second copy of the second phase-rotated signal 533 also in accordance a control signal received through bus 547 from the controller 517.

The third switching device 573 enables the signal from the third BPSK modulator 567 to be transmitted to the second output network 507 when the third switching device 573 is closed and prevents the signal from the third BPSK modulator 567 from being transmitted to the second output 507 network when open.

The fourth switching device 573 enables the signal from the fourth BPSK modulator 569 to be transmitted to the second output network 507 when the fourth switching device 575 is closed and prevents the signal from the fourth BPSK modulator 569 from being transmitted to the second output network 507 when open.

The open and closed positions of the third switching device 573 and the fourth switching device 575 are driven by a control signal from the controller 517 received through bus 553.

When the third switching device 573 is closed, the signal from the third BPSK modulator 567 passes through a third driver 579 and third PA 581 to the second output network 507. When the fourth switching device 575 is closed, the signal from the second BPSK modulator 539 passes through a fourth driver 583 and a fourth PA 585 to the second output network 507.

The envelope of the signal from the third PA 581 is modulated by a second envelope modulation circuit 587 in accordance with a control signal from the controller 517 over bus 553. The envelope of the signal from the fourth PA 585 is modulated by the second envelope modulation circuit 587 in accordance a control signal from the controller 517 received through bus 553.

The radar transmit system 500 supports flexible multi-mode MIMO signal generation but requires fewer components than prior art solutions. Operational characteristics of the radar system 500 are summarized in Table 1. The controller 517 is used to generate modulation and control signals. When performing time division multiplexing, the controller 517 generates shifted gate pulses to the switch in each antenna path. During TDM, transmissions from the antennas (301) are nonconcurrent. Transmissions have minimal or no temporal overlap. During CDM, the controller 517 generates a phase coding signal to modulate chirping pulses through the BPSK modulators 537, 539, 567, 569. During DDM, the controller 517 generates $\sin(2\pi f_d t)$, $\sin(4\pi f_d t)$, $\sin(2\pi f_d t)$ modulation signals to modulate chirping pulses through the phase rotators 523, 525, where $f_d = 2v_{max}/\lambda$, $v_{max}$ is the maximum vehicle speed for radar to detect, and $\lambda$ is the operating RF frequency. The modulation signal is generated in discrete time of $t=0, T_c, 2T_c, \ldots, NT_c$, in which $T_c$ is the chirp period of a FMCW signal. In at least one example of this disclosure, whether the controller 517 controls the remainder of the radar system 500 to perform TDM, CDM or DDM is determined in response to a user input. In at least one example of this disclosure, whether the controller 517 controls the remainder of the radar system 500 to perform TDM, CDM or DDM is determined responsive to detection of environmental conditions by one or more external sensors (not shown).

TABLE 1

| MIMO Mode | Control Signal | Implementation |
| --- | --- | --- |
| Time Division Multiplexing (TDM) | Gate pulses on slow-time waveform | Switch and Envelope Modulator. + DDS |
| Bi-Phase Shift-Key (CDM) | Phase coding (e.g. Hadmard) on slow-time waveform | BPSK Modulator + DDS |
| Doppler-Division Multiplexing (DDM) | Frequency shifting (Max Doppler) on slow-time waveform | Phase Rotator + (CDM) + DDS |

Figure 6:
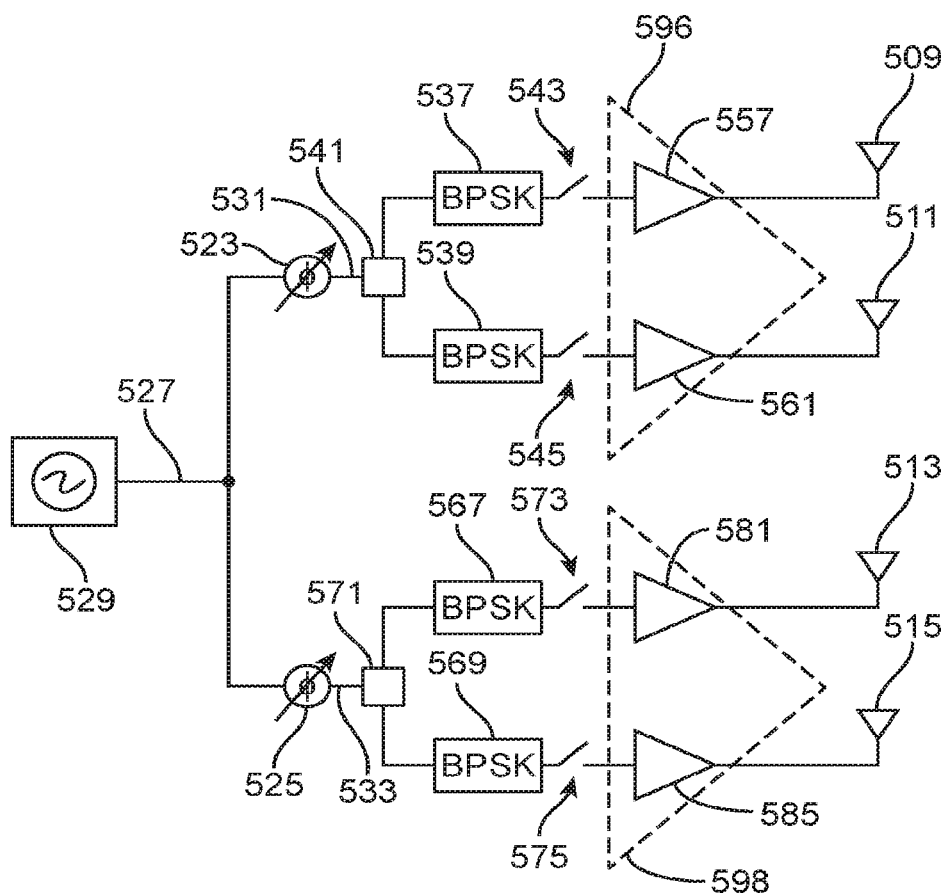
FIG. 6 illustrates aspects of a radar system, in accordance with an example of this disclosure.

FIG. 6 illustrates a reconfigurable MIMO radar system 600 in accordance with an example of this disclosure. As in FIG. 5, a first phase rotator 523 and a second phase rotator 525 are configured to receive an oscillation signal 527 from an oscillation signal generator 529. The first phase rotator 523 is connected to a first BPSK modulator 537 and a second BPSK modulator 539 by a first power splitter 541. The first power splitter 541 transmits a first copy of a first rotated signal 531 to the first BPSK modulator 537, and a second copy to the second BPSK modulator 539. The first BPSK modulator 537 is connected to a first switching device 543, and the second BPSK modulator 539 is connected to a second switching device 545. The first BPSK modulator 537 modulates the first copy of the first phase-rotated signal 531. The second BPSK modulator 539 modulates the second copy of the first phase-rotated signal 531.

The first switching device 543 enables the signal from the first BPSK modulator 537 to be transmitted to the first antenna through a first PA 557 when the first switching device 543 is closed and prevents the signal from the first BPSK modulator 537 from being transmitted (through PA 557) to the first antenna 509 when open.

The second switching device 545 enables the signal from the second BPSK modulator 539 to be transmitted to the second antenna 511 through a second PA 561 when the second switching device 545 is closed and prevents the signal from the second BPSK modulator 539 from being transmitted to the second antenna 511 when open. The first PA 557 and the second PA 561 are powered by a first power source 596.

The second phase rotator 525 is connected to a third BPSK modulator 567 and a fourth BPSK modulator 569 by a second power splitter 571. The second power splitter 571 transmits a first copy of a second phase-rotated signal 533 to the third BPSK modulator 567, and a second copy to the fourth BPSK modulator 569. The third BPSK modulator 567 is connected to a third switching device 573, and the fourth BPSK modulator 569 is connected to a fourth switching device 575. The third BPSK modulator 567 modulates the first copy of the second phase-rotated signal 533. The fourth BPSK modulator 569 modulates the second copy of the second phase-rotated signal 533.

The third switching device 573 enables the signal from the third BPSK modulator 567 to be transmitted to the third antenna when the third switching device 573 is closed and prevents the signal from the third BPSK modulator 567 from being transmitted to the third antenna when open.

The fourth switching device enables the signal from the fourth BPSK modulator 569 to be transmitted to the second output network when the fourth switching device 575 is closed and prevents the signal from the fourth BPSK modulator 569 from being transmitted to the second output network when open.

When the third switch is closed, the signal from the third BPSK modulator 567 passes through a third PA 581 to the third antenna 513. When the fourth switch 575 is closed, the signal from the second BPSK modulator 539 passes through a fourth PA 585 to the fourth antenna. The third PA 581 and the fourth PA 585 are powered by a second power source 598.

The radar system 600 of FIG. 6 provides millimeter-wave power combining and increased virtual channels without requiring more power than would commonly be required for the increase in channels. In at least one example, the radar system 600 provides millimeter-wave power combining and increased virtual channels without undesirable changes in thermal conditions. In some examples of this disclosure, a radar system (e.g., 600) achieves such benefits without resorting to on-chip power combining. The transmitter architecture of the radar system 600 uses spatial power combining through antennas. The transmitter architecture of the radar system 600 obviates the need for lossy on-chip power combining. In at least one example, the radar system 600 has high effective isotropic radiated power at antennas (e.g., 509). In at least one example, multiple smaller PA (e.g., 585) transistors are used instead of fewer larger PA transistors, thereby allowing for increased channels without coming up against power and/or thermal constraints. For example, to deliver a specific RF power, one large PA may use a transistor with a given area or two smaller PAs with transistors each with half the area can be used to meet the same RF power requirement after spatial power combining, while at the same time more channels are achieved if MIMO modulation is applied to each TX. In an example of this disclosure, a transmission radiation beam is steered by shaping phase distributions across subarrays. The phase rotators control the shaping of phase distributions. In examples of this disclosure, one phase rotator is shared by two antennas in a subarray. This sharing arrangement consumes less power and more diminutive than arrangements with more phase rotators.

According to examples of this disclosure, a radar system supports a flexible antenna interface. For example, an output network can operate as a single-end port and a differential port. When an output network is operated as a single-end port, the PAs are driven in phase by the BPSK modulators of the same path. When an output network is operated as a differential port, the PAs corresponding to a given phase rotator are driven out of phase the BPSK modulator in each path. When the output network is operated as a differential port, each pair of PAs corresponding to a phase rotator can form a virtual transmit channel. When the output network is operated as a single-end port, each PA can form a physical transmit channel.

Figure 7A:
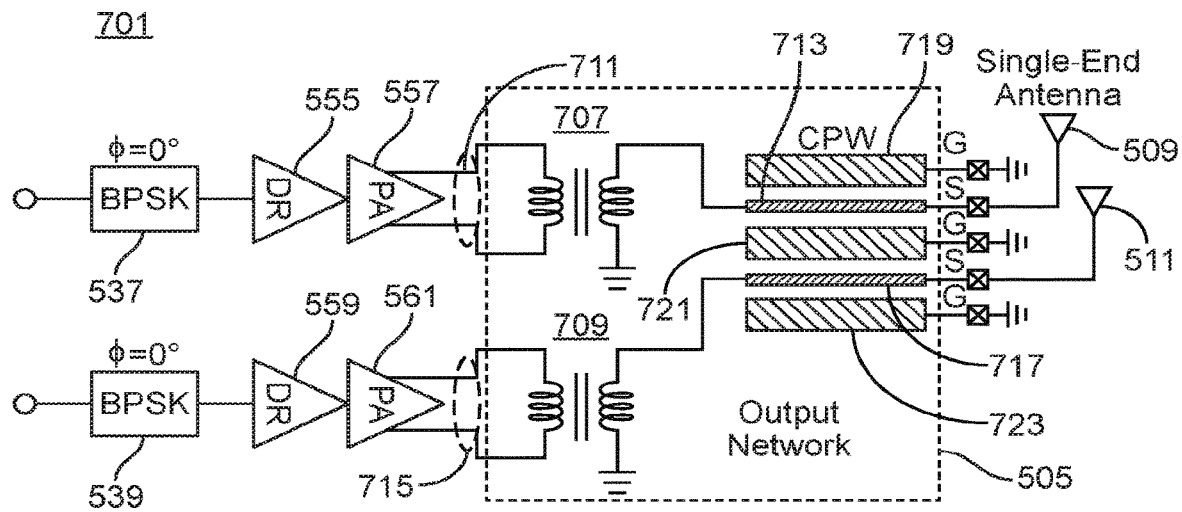
FIG. 7A illustrates aspects of a radar system, in accordance with an example of this disclosure.

FIG. 7A illustrates a radar system 701 in accordance with an example of this disclosure. The radar system 701 includes a first BPSK modulator 537 and a second BPSK modulator 539. The first BPSK modulator 537 is connected to a first PA 557 through a first driver 555. The first PA 557 outputs a first differential signal 711 to a first balun 707 of the output network 505. The first balun 707 outputs a signal from the balun 707 to a first single-end antenna 509 through a first coplanar waveguide (CPW) 713. In some examples, other types of transmission lines can be used instead of CPWs. The second BPSK modulator 539 is connected to a second PA 561 through a second driver 559. The second PA 561 outputs a second differential signal 715 to second balun 709 of the output network 505. The second balun 709 outputs the second differential signal 715 to a second single-end antenna 511 through a CPW 717. The output network 505 includes third 719, fourth 721 and fifth 723 grounded CPWs.

Figure 7B:
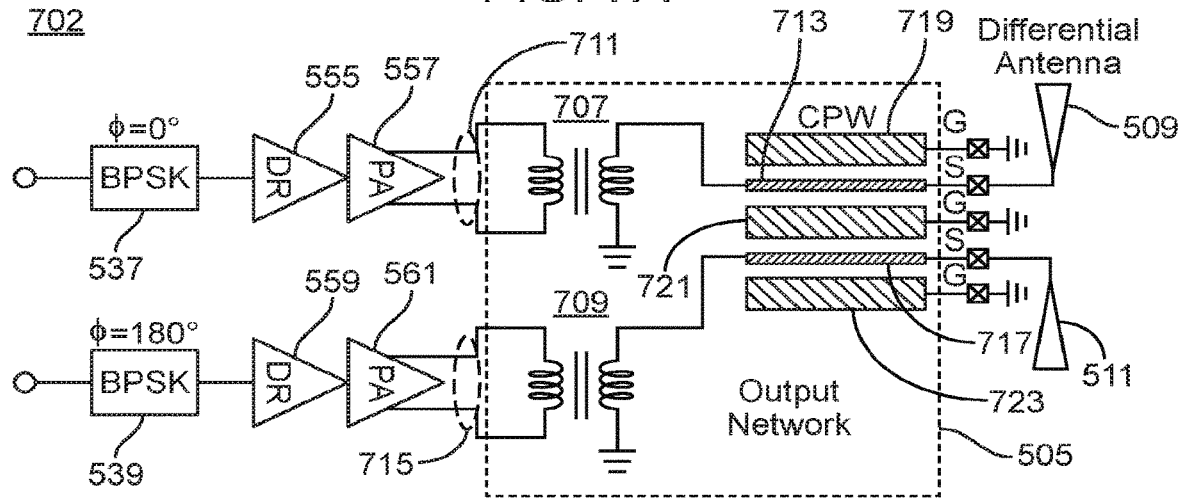
FIG. 7B illustrates aspects of a radar system, in accordance with an example of this disclosure.

FIG. 7B illustrates a radar system 702 in accordance with an example of this disclosure. The radar system 702 includes a first BPSK modulator 537 and a second BPSK modulator 539. The first BPSK modulator 537 is connected to a first PA 557 through a first driver 555. The first PA 557 outputs a first differential signal 711 to a first balun 707 of the output network 505. The first balun 707 outputs the first differential signal 711 to a first differential antenna 509' through a first coplanar waveguide (CPW) 713. The second BPSK modulator 539 is connected to a second PA 561 through a second driver 559. The second PA 561 outputs a second differential signal 715 to second balun 709 of the output network 505. The second balun 709 outputs the second differential signal 715 to a second differential antenna 511' through a second CPW 717. The output network 505 includes third 719, fourth 721 and fifth 723 grounded CPWs. In at least one example, the output network 505 is off-chip. In at least one example, the output network 505 is on-chip (e.g., on a front end chip; see FIGS. 4-6).

Figure 7C:
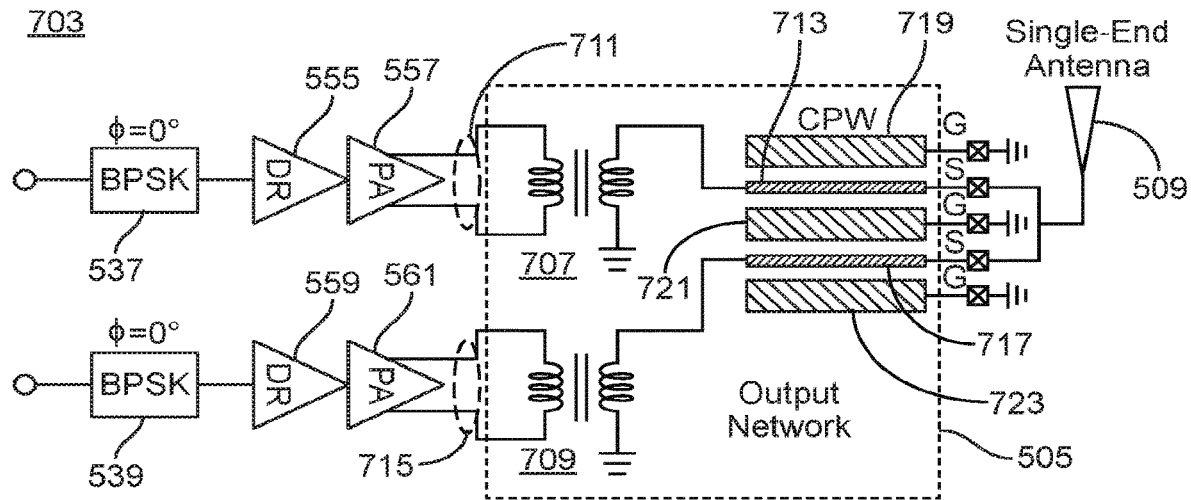
FIG. 7C illustrates aspects of a radar system, in accordance with an example of this disclosure.

FIG. 7C illustrates a radar system 703 in accordance with an example of this disclosure. The radar system 703 includes a first BPSK modulator 537 and a second BPSK modulator 539. The first BPSK modulator 537 is connected to a first PA 557 through a first driver 555. The first PA 557 outputs a first differential signal 711 to a first balun 707 of the output network 505. The first balun 707 outputs the first differential signal 711 to a single-ended antenna 509 through a first CPW 719. The second BPSK modulator 539 is connected to a second PA 561 through a second driver 559. The second PA 561 outputs a second differential signal 715 to a second balun 709 of the output network. The second balun 709 outputs the second differential signal 715 to the single-end antenna through a second CPW. The output network includes third 719, fourth 721 and fifth 723 grounded CPWs. In at least one example, the output network 505 is off-chip. In at least one example, the output network 505 is on-chip.

Figure 8:
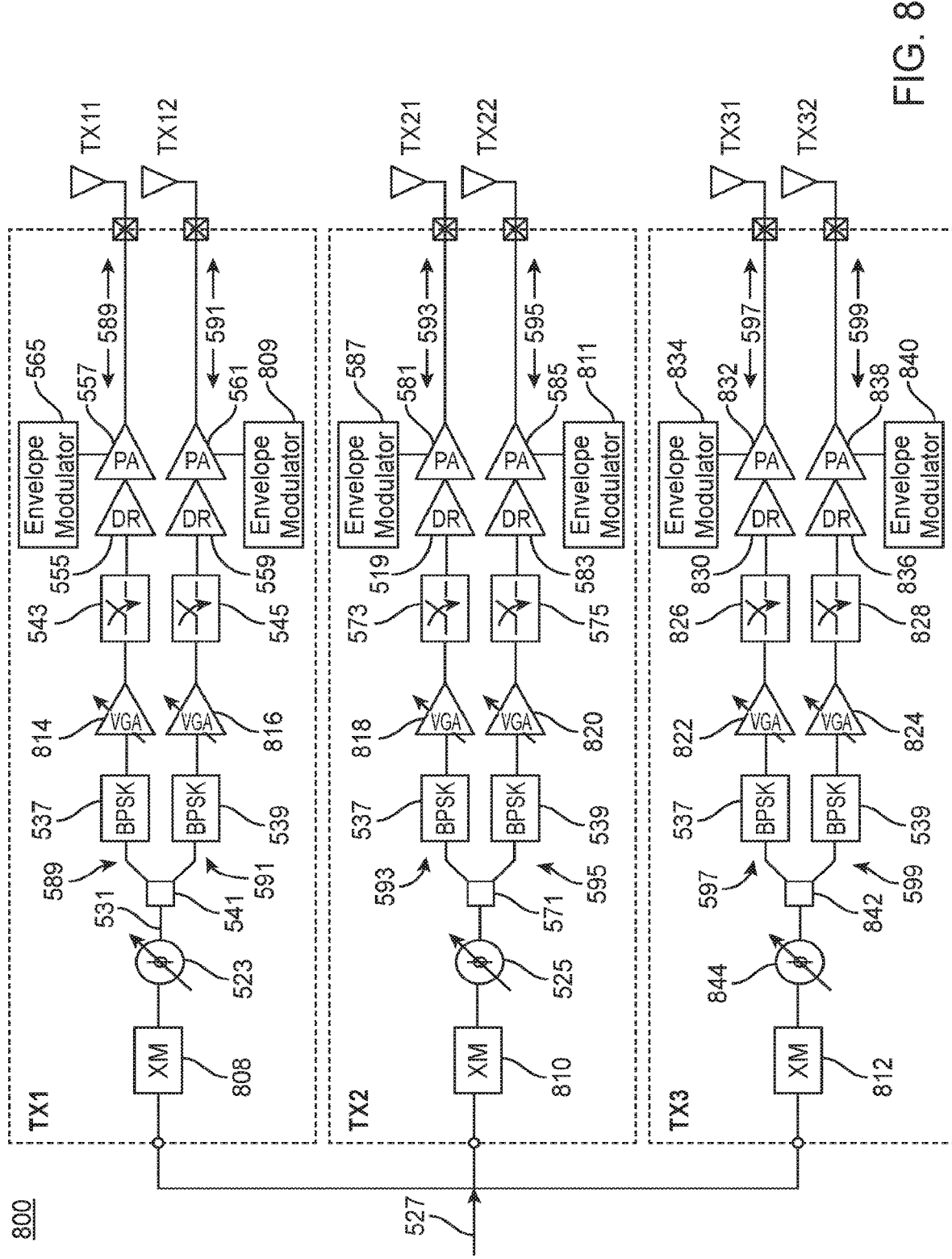
FIG. 8 illustrates a three-transmitter radar system, in accordance with an example of this disclosure.

FIG. 8 illustrates a radar transmit system 800 in accordance with an example of this disclosure. The radar system 800 includes three transmitters. The first transmitter TX1 includes a first frequency multiplier 808 which multiplies the frequency of a first copy of an oscillation signal 527 from an oscillation signal generator (not shown) and delivers the higher frequency signal to a first phase rotator 523. The first phase rotator 523 is connected to a first antenna TX11 through a first path 589. The first phase rotator 523 is connected to a second antenna TX12 through a second path 591. The first path 589 comprises a first BPSK modulator 537 which is connected to a first switch 543 through a first variable gain amplifier (VGA) 814. When the first switch 543 is closed the signal from the first VGA 814 passes through a first driver 555 to a first PA 557 to the first antenna TX11. The envelope of the signal emitted from the first PA 557 can be modulated by a first envelope modulator 565. The second path 591 comprises a second BPSK modulator 539 which is connected to a second switch 545 through a second variable gain amplifier (VGA) 816. When the second switch 545 is closed the signal from the second VGA 816 passes through a second driver 559 to a second PA 561 to the second antenna TX12. The envelope of the signal emitted from the second PA 561 can be modulated by a second envelope modulator 809.

The second transmitter TX2 includes a second frequency multiplier 810 which multiplies the frequency of a second copy of the oscillation signal 527 from an oscillation signal generator (not shown) and delivers the higher frequency signal to a second phase rotator 525. The second phase rotator 525 is connected to a third antenna TX21 through a third path 593. The second phase rotator 525 is connected to a fourth antenna TX22 through a fourth path 595. The third path 593 comprises a third BPSK modulator 567 which is connected to a third switch 573 through a third VGA 818. When the third switch 573 is closed, the signal from the third VGA 818 passes through a third driver 519 and third PA 581 to the antenna TX21. The envelope of the signal emitted from the third PA 581 can be modulated by a third envelope modulator 587. The fourth path 595 comprises a fourth BPSK modulator 569 which is connected to a fourth switch 575 through a fourth VGA 820. When the fourth switch 575 is closed, the signal from the fourth VGA 820 passes through a fourth driver 583 and a fourth PA 585 to the fourth antenna TX22. The envelope of the signal emitted from the fourth PA 585 can be modulated by a fourth envelope modulator 811.

The third transmitter TX3 includes a third frequency multiplier 812 which multiplies the frequency of a third copy of the oscillation signal 327 from the oscillation signal generator (not shown) and delivers the higher frequency signal to a third phase rotator 844. The third phase rotator 844 is connected to a fifth antenna TX31 through a fifth path 597. The third phase rotator 844 is connected to a sixth antenna TX32 through a sixth path 599. The fifth path 597 comprises a fifth BPSK 537 which is connected to a fifth switch 826 through a fifth VGA 822. When the fifth switch 826 is closed, the signal from the fifth VGA 822 passes through a fifth driver 830 and fifth PA 832 to the fifth antenna TX31. The envelope of the signal emitted from the fifth PA 832 can be modulated by a fifth envelope modulator 834. The sixth path 599 comprises a sixth BPSK 539 which is connected to a sixth switch 828 through a sixth VGA 824. When the sixth switch 828 is closed, the signal from the sixth VGA 824 passes through a sixth driver 836 and a sixth PA 838 to the sixth antenna TX32. The envelope of the signal emitted from the sixth PA 838 can be modulated by a sixth envelope modulator 844.

The radar transmit system 800 supports six transmit channels (one for each antenna). The radar system 800 contains three transmit subarrays (one for each phase rotator). The radar system 800 thus provides six channels without requiring more power or space than would accompany six channels in existing solutions. Each transmitter (e.g., TX1) has a set of transmission paths, and each set (e.g., 589, 591) of transmission paths shares a single PR 523. As noted, the radar system 800 supports six channels which can be used for TDM modulation, CDM modulation, and DDM modulation. The combination of three PRs and six BPSK modulators provides DDM over six channels. FIG. 8 illustrates an example of intra-subarray spatial power combining. That is, within each subarray/transmitter, (e.g., TX1), if MIMO modulation were not applied to each channel, (e.g., TX11 or TX12), TX11 and TX 12 would constitute one channel having a radiational power equal to the sum of the radiational power of TX11 and the radiational power of TX12 (as though combined after being radiated by antennas in free space). This is contrary to physical on-chip power combining.

In at least one example, the three subarrays are controlled so as to have independent phasing and amplitude shaping for beamforming. In at least one example, a radar system of this disclosure can provide six-channel TDM.

FIG. 9A illustrates a 4×4 matrix 900 corresponding to Hadamard code that can be used to modulate 4 transmit channels. In the matrix 900, +1 corresponds to a phase angle of zero degrees, and −1 corresponds to a phase angle of 180 degrees. Each row of the matrix 900 can be represented by a vector. The vectors are applied to four transmit channels over four sequential chirps. Thereafter, each reflected chip is demodulated using the same matrix 900.

In accordance with an example of this disclosure, a radar system (e.g., 800) provides 6-channel DDM by using three PRs and 6 BPSK modulators in joint operation. FIG. 9B is a table 901 illustrating a relationship of transmission antennas (TX11, TX12, TX21, TX22, TX31, TX32) when driven by three PRs and 6 BPSK modulators in joint operation. Each column 902, 904, 906, 908, 910, 912 refers to a single antenna. Each row 914, 916, 918, 920, 922, 924 refers to different moment in time. At t=0, the signals transmitted by each of the antennas are in phase (914). At t=1, the signal transmitted by each of antennas TX21 through TX32 is out of phase with transmit antenna to the immediate left by 60 degrees (916). At t=2, the signal transmitted by each of antennas TX21 through TX32 is out of phase with transmit antenna to immediate left by 120 degrees (918). At t=3, the signal transmitted by each of antennas TX21 through TX32 is out of phase with the transmit antenna to its immediate left by 180 degrees (920). At t=4, the first antenna and the fourth antenna are in phase, the second antenna and the fifth antenna are in phase, and the third antenna and the sixth antenna are in phase (922). At t=4, each in-phase pair is out of phase by 120 degrees with the other in-phase pairs. At t=5, each transmit antenna is 60 degrees out of phase with the antenna each antenna's immediate left (924). In accordance with an example of this disclosure, 12 transmit antennas and 16 receive antennas provide 192 MIMO channels with an angular resolution of one degree.

In accordance with one or more examples of this disclosure, a radar system comprising four receive antennas and six transmit antennas can detect a target (350) which is a short distance from the radar system and can detect a target which is a much greater distance from the radar system. In at least one example, short range detection and longer-range detection non-simultaneously.

FIG. 10A illustrates a physical antenna arrangement of a radar system 1000 for short range detection, as driven by BPSK modulators to perform DDM. The radar system 1000 includes a receiver array 1004 and a transmitter array 1006. Each box (e.g., 1016) in FIG. 10A corresponds to a patch antenna, and each set of four connected patch antennas corresponds to a sub-array. The first receive antenna sub-array RX3 is two wavelengths apart from a second receive sub-array RX4, where the wavelength is the wavelength at the system's operating frequency. The transmit sub-arrays of the receiver array 1006 are each one-half wavelength apart.

FIG. 10B illustrates the virtual antenna counterpart 1001 to the physical arrangement 1000 of FIG. 10A. Each box in array 1008 in FIG. 10B corresponds to a (virtual) patch antenna.

FIG. 10C illustrates a physical antenna arrangement of a radar system 1002 for short longer-range detection, as driven by BPSK modulators. Radar system 1002 includes a receiver 1010 and a transmitter 1012. Each box in FIG. 10C corresponds to a patch antenna. The first receive sub-array RX1 is two wavelengths apart from the second receive sub-array RX2. The two transmit sub-arrays TX11, TX12 are four wavelengths apart from one another.

FIG. 10D illustrates the virtual antenna counterpart 1003 to the physical arrangement 1002 of FIG. 10C. Each box in array 1014 of FIG. 10D corresponds to a (virtual) patch antenna.

FIG. 11A illustrates a radar system 1100 with three transmit channels 589, 591, 593, 595, 597, 599, each of which corresponds to a transmitter TX1, TX2, TX3. The radar system 1100 can perform 3-channel DDM. The antennas TX11, TX12, TX21, TX22, TX31, TX32 of each transmitter TX1, TX2, TX3 are one-half wavelength apart from one another. The transmitters TX1, TX2, TX3 are symmetrical and are two wavelengths apart.

FIG. 11B illustrates a radar system 1101 with six transmit channels. The radar system 1101 of FIG. 11B has three more channels than the radar system 1100 of FIG. 11A because the transmit antennas TX11, TX12, TX21, TX22, TX31, TX32 of each transmitter TX1, TX2, TX3 are four wavelengths apart.

FIG. 11C illustrates a radar system 1102 with eight receiver antennas RX11, RX21, RX31, RX41, RX12, RX22, RX32, RX42. Each receiver antenna RX11, RX21, RX31, RX41, RX12, RX22, RX32, RX42 is switchably connected to a receive line 1104, 1106, 1108, 1110 along with another receiver antenna RX11, RX21, RX31, RX41, RX12, RX22, RX32, RX42.

In one example of this disclosure, three transmit-channel DDM (see FIG. 11A) is multiplexed with four receive-channel TDM (see FIG. 11C), yielding twelve (3×4) virtual channels. In one example of this disclosure, six transmit-channel DDM (see FIG. 11A) is multiplexed with eight receive-channel TDM (see FIG. 11C), forty-eight (6×8) virtual channels.

Figure 12:
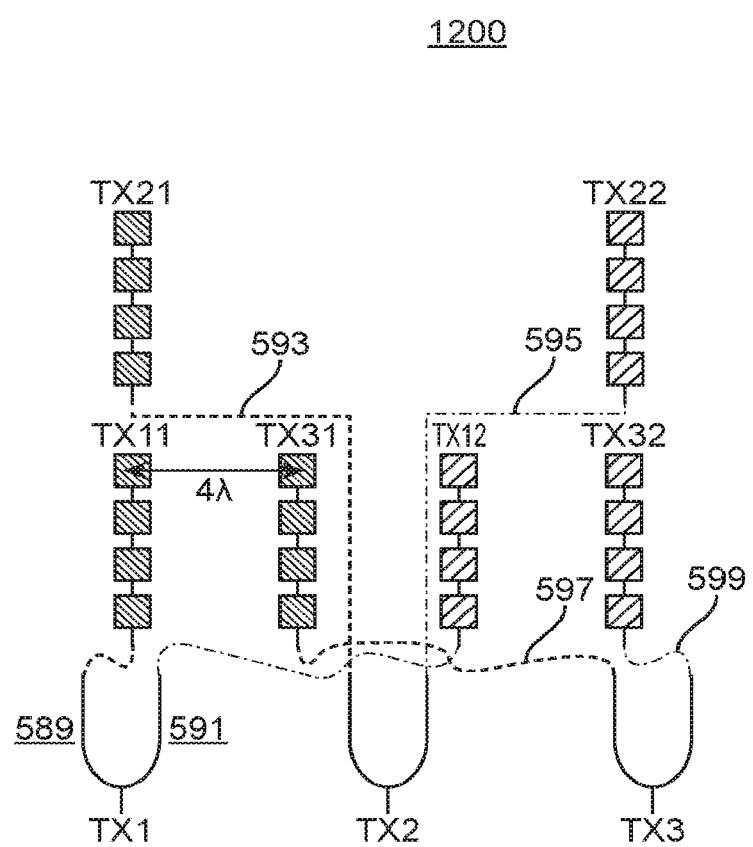
FIG. 12 illustrates a radar system 1200 with three transmitters, in accordance with an example of this disclosure.

FIG. 12 illustrates a radar system 1200 with three transmitters TX1, TX2, TX3. Each transmitter TX1, TX2, TX3 has two transmit antennas. The first transmit antenna TX11 of the first transmitter is four wavelengths distal from the first transmit antenna TX31 of the third transmitter TX3. The second transmit antenna TX12 of the first transmitter TX1 is four wavelengths distal from the second transmit antenna TX32 of the third transmitter TX3. The first transmit antenna TX21 of the second transmitter TX2 is colinear with the first transmit antenna TX11 of the first transmitter TX1. The second transmit antenna TX22 of the second transmitter TX2 is colinear with the second transmit antenna TX32 of the third transmitter TX3.

In at least one example of this disclosure the radar system 1200 of FIG. 12 forms a radar system with the radar system 1102 of FIG. 11C. In at least one example of this disclosure, the radar system so formed provides 4-dimensional radar. In at least one example of this disclosure, the radar system so formed provides eight (2×4) virtual channels in the azimuth plane, when TDM is not used to 4 RX channels 1102. In at least one example of this disclosure, the radar system so formed provides thirty-two (4×8) virtual channels in the azimuth plane, when TDM is used to 4 RX channels 1102. In at least one example of this disclosure, the radar system so formed provides beam steering in the elevation plane.

Examples of this disclosure include the following enumerated examples:

1. An automotive radar system, comprising: multiple radar antennas; and a radar front end chip having: a plurality of phase rotators coupled to a local oscillator, wherein each phase rotator of the plurality of phase rotators is coupled to multiple digital phase modulators; a plurality of switches (e.g., 543, 545, 573, 575) that couple selectable ones of the multiple digital phase modulators to respective amplifiers, each amplifier coupled to a respective antenna output; and a controller coupled to provide digital control signals to the plurality of phase rotators, the multiple digital phase modulators, and the plurality of switches to synthesize transmit signals for each of the multiple radar antennas.
2. The automotive radar system of example 1, wherein the multiple digital phase modulators are bi-phase shift key (BPSK) modulators.
3. The automotive radar system of example 2, wherein the radar front end chip further includes envelope modulators coupled to said amplifiers to window or shape bursts in the transmit signals, the envelope modulators being controllable by digital control signals from the controller.
4. The automotive radar system of example 1, wherein the controller selectably provides time division multiplexing (TDM), code division modulation (CDM), and Doppler-division multiplexing (DDM), of the transmit signals.
5. The automotive radar system of example 4, wherein for TDM the controller supplies gate pulses to the plurality of switches, wherein for CDM the controller supplies phase code waveforms to the multiple digital phase modulators, and wherein for DDM the controller supplies frequency shift waveforms to the plurality of phase rotators.
6. The automotive radar system of example 1, wherein the controller provides off-chip power combining by causing multiple ones of the amplifiers to supply the same transmit signal to a given antenna of the multiple radar antennas, to different elements of the given antenna, or to different ones of the multiple radar antennas.
7. The automotive radar system of example 1, wherein the controller provides off-chip power combining by causing two of the amplifiers to supply the same transmit signal with opposite signs to elements of a given antenna of the multiple radar antennas, the given antenna being a differential antenna.
8. The automotive radar system of example 1, wherein the controller controls the plurality of phase rotators to provide beam steering.
9. A radar front end chip, comprising: a plurality of phase rotators coupled to a local oscillator, wherein each phase rotator of the plurality of phase rotators is coupled to multiple digital phase modulators; an array of amplifiers, each amplifier coupled to a respective antenna output; and a plurality of switches that couple selectable ones of the multiple digital phase modulators to respective amplifiers, wherein the plurality of phase rotators, the multiple digital phase modulators, and the plurality of switches, each configured to receive digital control signals from a controller to synthesize transmit signals for each of the antenna outputs.
10. The radar front end chip of example 9, wherein the multiple digital phase modulators are bi-phase shift key (BPSK) modulators.
11. The radar front end chip of example 10, further comprising envelope modulators coupled to said amplifiers to window or shape bursts in the transmit signals, the envelope modulators being controllable by digital control signals from the controller.
12. The radar front end chip of example 9, wherein the plurality of switches is operable to implement time division multiplexing (TDM) in response to gate pulses from the controller, the multiple digital phase modulators are operable to implement code division modulation (CDM) in response to code waveforms from the controller, and the plurality of phase rotators are operable to provide Doppler-division multiplexing (DDM) in response to frequency shift waveforms from the controller.

13. The radar front end chip of example 9, wherein a plurality of amplifiers of the array of amplifiers is configured to supply the same transmit signal to different antenna outputs to provide off-chip power combining.

14. The radar front end chip of example 9, wherein two of the amplifiers to supply the same transmit signal with opposite signs to different antenna outputs to drive a differential antenna.

15. The radar front end chip of example 9, wherein the plurality of phase rotators is operable to provide beam steering in response to control signals from the controller.

16. A method of manufacturing a radar front end chip, the method comprising: coupling a plurality of phase rotators to a local oscillator input; coupling each phase rotator of the plurality of phase rotators to multiple digital phase modulators; coupling each amplifier in an array of amplifiers to a respective antenna output; providing a plurality of switches that couple selectable ones of the multiple digital phase modulators to respective amplifiers; and configuring the plurality of phase rotators, the multiple digital phase modulators, and the plurality of switches, to receive digital control signals from a controller to synthesize individual transmit signals for each of the antenna outputs.

17. The method of example 16, wherein the multiple digital phase modulators are bi-phase shift key (BPSK) modulators.

18. The method of example 17, further comprising coupling envelope modulators to said amplifiers to window or shape bursts in the transmit signals, the envelope modulators being controllable by digital control signals from the controller.

19. The method of example 16, wherein the plurality of switches is operable to implement time division multiplexing (TDM) in response to gate pulses from the controller, the multiple digital phase modulators are operable to implement code division modulation (CDM) in response to code waveforms from the controller, and the plurality of phase rotators are operable to provide Doppler-division multiplexing (DDM) in response to frequency shift waveforms from the controller.

20. The method of example 16, wherein the individual transmit signals are made the same to provide off-chip power combining.

21. A radar system 500, comprising: a control circuit 517 configured to generate a plurality of control signals; an oscillation signal generator 529 configured to generate an oscillation signal 527; a phase rotator 523 configured to produce, responsive to a first control signal (535), a phase-rotated signal 531 by rotating a phase of the oscillation signal 527; a first signal path 589 connected to the phase rotator 523 by a power splitter circuit 541, wherein: the first signal path 589 comprises a first phase modulator 537 switchably connected by a first switching device 543 to a first antenna 509 through a first power amplifier 557, the first phase modulator 537 is configured to produce, responsive to a second control signal (547), a first phase-modulated signal 549 by modulating the phase of the phase-rotated signal 531 by a first amount, and the first switching device 543 is configured to, responsive to a third control signal (553), alternately couple and decouple the first phase-modulated signal 549 to the first antenna 509; and a second signal path 591 connected to the phase rotator 523 by the power splitter circuit 541, wherein: the second signal path 591 comprises a second phase modulator 539 switchably connected by a second switching device 545 to a second antenna 511 through a second power amplifier 561, the second phase modulator 539 is configured to produce, responsive to a fourth control signal (539), a second phase-modulated signal 551 by modulating the phase of the phase-rotated signal 531 by a second amount, and the second switching device 545 is configured to, responsive to a fifth control signal (553), alternately couple and decouple the second phase-modulated signal 551 to the second antenna 511.

22. The radar system of example 1, further comprising an envelope modulator 565, wherein: the envelope modulator 565 is configured to modulate, responsive to a sixth control signal (553), an envelope of the first phase-modulated signal 549 at the first power amplifier 557, and the envelope modulator 565 is further configured to modulate, responsive to a seventh control signal (553), an envelope of the second phase-modulated signal 551 at the second power amplifier 561.

23. The radar system of example 2, wherein the control circuit 517 is configured to cause the first antenna and the second antenna to emit a time-division multiplexed signal stream by generating one or more of the plurality of control signals as pulses having a slow-time waveform.

24. The radar system of example 2, wherein the control circuit 517 is configured to cause the first antenna and the second antenna to emit a code-division multiplexed signal stream by generating one or more of the plurality of control signals as phase-coded signals having a slow-time waveform.

25. The radar system of example 2, wherein the control circuit 517 is configured to cause the first antenna and the second antenna to emit a doppler-division multiplexed signal stream by generating one or more of the plurality of control signals as frequency-shifted signals having a slow-time waveform.

26. The radar system of example 2, further comprising one or more signal path sets, wherein each of the one or more signal path sets comprises: a second phase rotator 525 configured to produce, responsive to an eighth control signal (535), a second phase-rotated signal 533 by rotating a phase of a copy of the oscillation signal 527; a third signal path 593 connected to the second phase rotator 525 by a second power splitter circuit 571, wherein: the third signal path 593 comprises a third phase modulator 567 switchably connected by a third switching device 573 to a third antenna 513 through a third power amplifier 581, the third phase modulator 567 is configured to produce, responsive to a ninth control signal (547), a third phase-modulated signal 549' by modulating the phase of the second phase-rotated signal 533 by a third amount, and the third switching device 573 is configured to, responsive to a tenth control signal (553), alternately couple and decouple the third phase-modulated signal 549' to the third antenna 513; and a fourth signal path 595 connected to the second phase rotator 525 by the second power splitter circuit 571, wherein: the fourth signal path 595 comprises a fourth phase modulator 569 switchably connected by a fourth switching device 575 to a fourth antenna 515 through a fourth power amplifier 585, the fourth phase modulator 569 is configured to produce, responsive to an eleventh control signal (539), a fourth phase-modulated signal 551' by modulating the phase of the phase-rotated signal 533 by a fourth amount, and the fourth switching device 574 is configured to, responsive to a twelfth control signal (553), alternately couple and decouple the fourth phase-modulated signal 551' to the fourth antenna 515.

27. The radar system of example 6, wherein each of the one or more signal path sets further comprises a second envelope modulator 587, wherein: the second envelope modulator 587 is configured to modulate, responsive to a seventh control signal (553), an envelope of the third phase-modulated signal 549' at the third power amplifier 587, and the second envelope modulator 587 is further configured to modulate, responsive to a fourteenth control signal (553), an envelope of the fourth phase-modulated signal 551' at the fourth power amplifier 585.

Though the operations described herein may be set forth sequentially for explanatory purposes, in practice the method may be carried out by multiple components operating concurrently and perhaps even speculatively to enable out-of-order operations. The sequential discussion is not meant to be limiting. While the focus of the foregoing discussions has been radar systems, the principles set forth apply to any pulse-echo or continuous-wave travel time measurement systems. These and numerous other modifications, equivalents, and alternatives, should be apparent to those skilled in the art. It is intended that the following claims be interpreted to embrace all such modifications, equivalents, and alternatives where applicable.

What is claimed is:

1. A method for operating a radar chip, comprising:
   selectively coupling digital phase modulators in the radar chip to corresponding amplifiers in an array of amplifiers in the radar chip, wherein a given phase rotator of phase rotators in the radar chip is coupled to the digital phase modulators, and wherein a given amplifier in the array of amplifiers is coupled to a corresponding antenna output; and
   using the phase rotators and the digital phase modulators, synthesizing individual transmit signals for the antenna outputs.

2. The method of claim 1, wherein the digital phase modulators comprise bi-phase shift key (BPSK) modulators.

3. The method of claim 2, wherein a given BPSK modulator in the BPSK modulators is coupled to the given phase rotator by a power splitter.

4. The method of claim 1, wherein the method comprises, using envelope modulators, windowing or shaping bursts in the transmit signals.

5. The method of claim 4, wherein the envelope modulators are coupled to the amplifiers.

6. The method of claim 4, wherein the method comprises, using a controller, controlling the envelope modulators.

7. The method of claim 1, wherein the selective coupling of the digital phase modulators is performed using switches.

8. The method of claim 7, wherein the method comprises, using a controller, controlling the phase rotators, the digital phase modulators and the switches.

9. The method of claim 7, wherein the switches selectively implement time division multiplexing (TDM) of the transmit signals.

10. The method of claim 1, wherein the digital phase modulators selectively implement code division modulation (CDM) of the transmit signals based at least in part on phase code waveforms.

11. The method of claim 1, wherein the phase rotators selectively provide Doppler division multiplexing (DDM) of the transmit signals based at least in part on frequency shift waveforms.

12. The method of claim 1, wherein the individual transmit signals are the same.

13. The method of claim 1, wherein the method comprises off-chip power combining to cause the amplifiers to supply the same transmit signal to: a given antenna in the antennas; different elements of the given antenna; or different antennas.

14. The method of claim 1, wherein the method comprises off-chip power combining to cause two of the amplifiers to supply the same transmit signal with opposite signs to elements of the given antenna of the antennas; and
   wherein the given antenna comprises a differential antenna.

15. The method of claim 1, wherein the method comprises performing, using the phase rotators, beam steering.

16. The method of claim 1, wherein the method comprises providing a local oscillator to the phase rotators.

17. The method of claim 16, wherein the method comprises generating the local oscillator using a fractional N phase lock loop or a direct synthesis generator.

18. The method of claim 1, wherein the transmit signals provide multi-mode multiple-input multiple-output (MIMO) signal generation.

19. The method of claim 1, wherein the transmit signals are output non-concurrently with an overlap less than a predefined amount or no overlap.

20. The method of claim 1, wherein the radar chip uses time division multiplexing, code division modulation (CDM) or Doppler division multiplexing (DDM) of the transmit signals based at least in part on detected environmental conditions.

* * * * *